US011052790B2

(12) United States Patent
Suzuki et al.

(10) Patent No.: US 11,052,790 B2
(45) Date of Patent: Jul. 6, 2021

(54) VEHICLE SEAT STRUCTURE

(71) Applicant: MAZDA MOTOR CORPORATION, Hiroshima (JP)

(72) Inventors: Takashi Suzuki, Hiroshima (JP); Koji Nonowaki, Hiroshima (JP); Shin Sakai, Hiroshima (JP); Shigeru Kobayashi, Kure (JP); Hiroyuki Iwakura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/955,006

(22) PCT Filed: Feb. 28, 2019

(86) PCT No.: PCT/JP2019/007887
§ 371 (c)(1),
(2) Date: Jun. 17, 2020

(87) PCT Pub. No.: WO2019/187959
PCT Pub. Date: Oct. 3, 2019

(65) Prior Publication Data
US 2020/0384895 A1 Dec. 10, 2020

(30) Foreign Application Priority Data

Mar. 28, 2018 (JP) .............................. JP2018-061269

(51) Int. Cl.
*B60N 2/10* (2006.01)
*B60N 2/16* (2006.01)
(Continued)

(52) U.S. Cl.
CPC ................ *B60N 2/10* (2013.01); *B60N 2/16* (2013.01); *B60N 2/68* (2013.01); *B60N 2002/0208* (2013.01)

(58) Field of Classification Search
CPC ... B60N 2/10; B60N 2/16; B60N 2/68; B60N 2002/0208
(Continued)

(56) References Cited

U.S. PATENT DOCUMENTS

2011/0210592 A1 9/2011 Watanabe
2015/0210188 A1 7/2015 Hoshi et al.
(Continued)

FOREIGN PATENT DOCUMENTS

EP   2 894 061 A1   7/2015
JP   2001-149175 A  6/2001
(Continued)

OTHER PUBLICATIONS

International Search Report issued in PCT/JP2019/007887; dated May 14, 2019.
(Continued)

*Primary Examiner* — Mark R Wendell
(74) *Attorney, Agent, or Firm* — Studebaker & Brackett PC

(57) ABSTRACT

A vehicle seat structure includes: a first side frame (11*a*) extending in a front-rear direction along one side portion of a seat cushion (4); a second side frame (11*b*) extending in the front-rear direction along the other side portion of the seat cushion (4); posture changing mechanisms (6, 7) mounted on the first side frame (11*a*) and capable of changing the posture of the seat cushion (4), and reinforcement members (R1, R2) provided at a portion of the second side frame (11*b*) where the reinforcement members (R1, R2) overlap the posture changing mechanisms (6, 7) in a side view.

9 Claims, 10 Drawing Sheets

(51) Int. Cl.
   *B60N 2/68*   (2006.01)
   *B60N 2/02*   (2006.01)

(58) Field of Classification Search
   USPC .................................................. 297/452.18
   See application file for complete search history.

(56) References Cited

U.S. PATENT DOCUMENTS

| | | | |
|---|---|---|---|
| 2015/0239369 A1 | 8/2015 | Hoshi | |
| 2015/0336477 A1* | 11/2015 | Matsui | B60N 2/06 297/344.15 |
| 2016/0339821 A1 | 11/2016 | Akaike et al. | |
| 2016/0368399 A1 | 12/2016 | Hoshi | |
| 2017/0021742 A1* | 1/2017 | Whitaker | B60N 2/1635 |
| 2017/0086590 A1 | 3/2017 | Fujita et al. | |
| 2018/0065530 A1 | 3/2018 | Hoshi | |
| 2018/0208093 A1* | 7/2018 | Fukuda | B60N 2/68 |
| 2018/0290568 A1 | 10/2018 | Kijima et al. | |
| 2018/0290569 A1 | 10/2018 | Kijima et al. | |
| 2019/0241105 A1 | 8/2019 | Hoshi | |
| 2020/0223337 A1 | 7/2020 | Hoshi | |

FOREIGN PATENT DOCUMENTS

| | | |
|---|---|---|
| JP | 2010-259619 A | 11/2010 |
| JP | 2011178194 A | 9/2011 |
| JP | 2012071005 A | 4/2012 |
| JP | 2012131465 A | 7/2012 |
| JP | 2013119262 A | 6/2013 |
| JP | 2015093527 A | 5/2015 |
| JP | 2015217232 A | 12/2015 |
| JP | 2016005922 A | 1/2016 |
| JP | 2016215896 A | 12/2016 |
| WO | 2014045422 A1 | 3/2014 |
| WO | 2017056337 A1 | 4/2017 |

OTHER PUBLICATIONS

The extended European search report issued by the European Patent Office dated Nov. 27, 2020, which corresponds to European Patent Application No. 19777243.7-1010 and is related to U.S. Appl. No. 16/955,006.

* cited by examiner

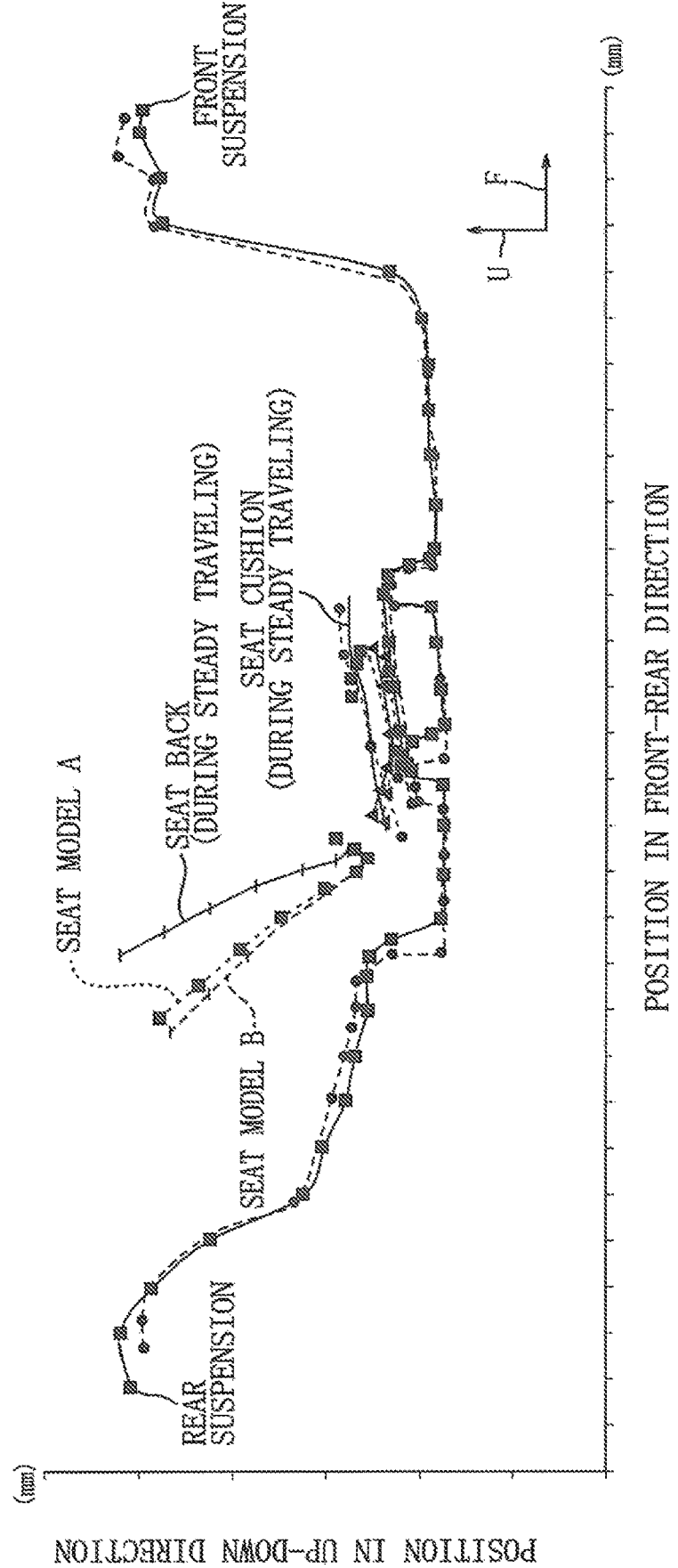

VEHICLE SEAT STRUCTURE

TECHNICAL FIELD

The present invention relates to a vehicle seat structure.

BACKGROUND ART

Conventionally, various techniques relating to characteristics of a frame, a cushion member, and the like of a vehicle seat have been proposed in order to enhance seating comfort of a seated occupant, traveling comfort in a vehicle, and the like.

Patent Literature 1 discloses a seat cushion member support mechanism including a front link connected to a front torsion bar, and a rear link connected to a rear torsion bar. The front link and the rear link are pivotally moved in opposite directions, when a load of a predetermined value or larger is applied thereto. A damper is disposed between a lower portion of the front link and a lower portion of the rear link. The damper expands or contracts, when a load of a predetermined value or larger is applied thereto, and generates a damping force. On the other hand, the damper does not expand or contract, when a load smaller than the predetermined value is applied thereto, and impact is reduced by elasticity of the front torsion bar and the rear torsion bar.

The seat cushion member support mechanism having the above configuration in Patent Literature 1 is a mechanism having so-called duffing-type non-linear characteristics. The duffing-type non-linear characteristics are advantageous in improving vibration absorption characteristics and impact absorption characteristics.

Generally, a posture changing mechanism for changing a seated posture of an occupant is equipped in a vehicle seat. As the posture changing mechanism, mainly, there are known reclining mechanism capable of changing a tilt angle, of a seat back, a lifter mechanism capable of changing a height position of a seat cushion, a tilt mechanism capable of changing a height position of a front end of a seat cushion, and the like.

The reclining mechanism includes a dedicated gear which is pivotally supported on a seat back frame. The lifter mechanism and the tilt mechanism include a dedicated gear which is pivotally supported on a seat cushion frame.

Traveling comfort actually experienced by a seated occupant may not be improved, even if characteristics of a frame, a cushion member, and the like of a vehicle seat are individually improved. In particular, when the posture changing mechanism is mounted on one of left and right seat cushion frames, a rigidity difference between left and right portions of a seat cushion may increase, and a difference between a behavior of the seat and a behavior of the vehicle may also increase accompanied by the increase in rigidity difference.

CITATION LIST

Patent Literature

Patent Literature 1: Japanese Unexamined Patent Application Publication No. 2015-217232

SUMMARY OF INVENTION

An object of the present invention is to provide a vehicle seat structure capable of reducing a rigidity difference between left and right portions of a seat provided with a posture changing mechanism.

As a configuration for achieving the above object, a seat structure according to the present invention is applied to a vehicle seat provided with a seat cushion and a seat back. The seat structure includes: a first side frame extending in a front-rear direction along one side portion of the seat cushion; a second side frame extending in the front-rear direction along the other side portion of the seat cushion; a posture changing mechanism mounted on the first side frame, and capable of changing a posture of the seat cushion; and a reinforcement member provided at a portion of the second side frame where the reinforcement member overlaps the posture changing mechanism in a side view.

The vehicle seat structure according to the present invention is able to reduce a rigidity difference between left and right portions of the seat cushion, and improve traveling comfort of an occupant.

BRIEF DESCRIPTION OF DRAWINGS

FIG. 11 is a graph illustrating a result of analysis, which has been carried out to verify an influence of a rigidity ratio between a frame structure and a non-frame structure on a behavior of a seat.

DESCRIPTION OF EMBODIMENTS

In the following, preferred embodiments for carrying out the present invention described with reference to the drawings. Description on the following preferred embodiments is merely and substantially an example, and does not intend to limit the scope of the present invention, an object of application thereof, or a use of application thereof.

First Embodiment

A first embodiment according to the present invention is described with reference to FIGS. 1 to 7.

Figure 1:
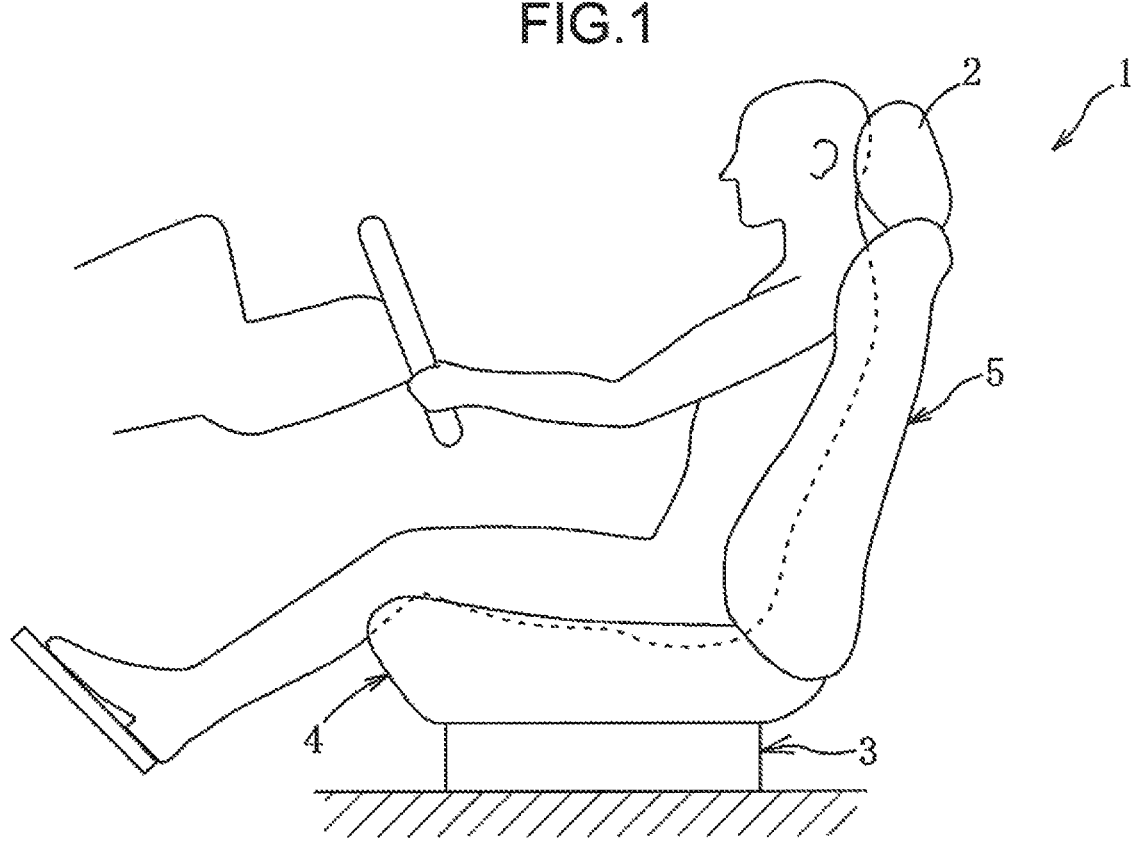
FIG. 1 is an overall schematic diagram of a vehicle seat according to a first embodiment of the present invention.

As illustrated in FIG. 1, a vehicle seat 1 according to the first embodiment includes, as main constituent elements, a head rest for receiving the head of a seated occupant, a leg mechanism 3 for fixing the seat 1 to a passenger compartment floor, a seat cushion 4 for supporting a part (buttock) corresponding to the ischial bone of the seated occupant, and a seat back 5 for supporting a part (back) corresponding to the spine (backbone) of the seated occupant.

The seat 1 includes, as a posture changing mechanism for adjusting a seated posture of the occupant, a lifter mechanism 6 capable of changing a height position of the seat cushion 4, a tilt mechanism 7 capable of changing a height position of a front end of the seat cushion 4, and a reclining mechanism 8 capable of changing a tilt angle of the seat back 5.

In the following description, "front", "rear", "left", and "right" are described with respect to a seated occupant seated on the vehicle seat 1 (a front left seat, which is a driver's seat) in a proper posture (posture illustrated in FIG. 1), and have the same definition as "front", "rear", "left", and "right" of a vehicle.

Figure 2:
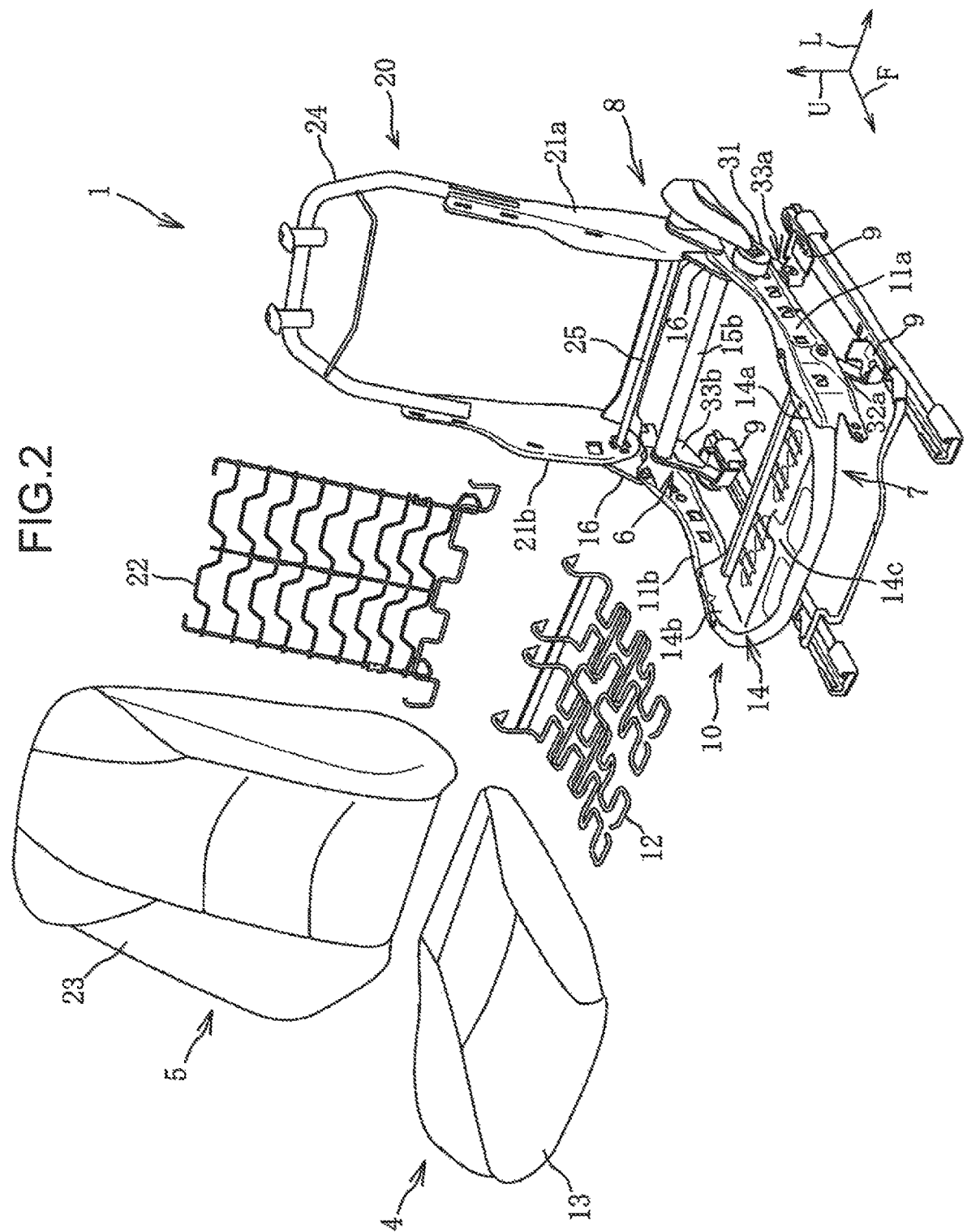
FIG. 2 is an exploded perspective view of the seat.
Figure 3:
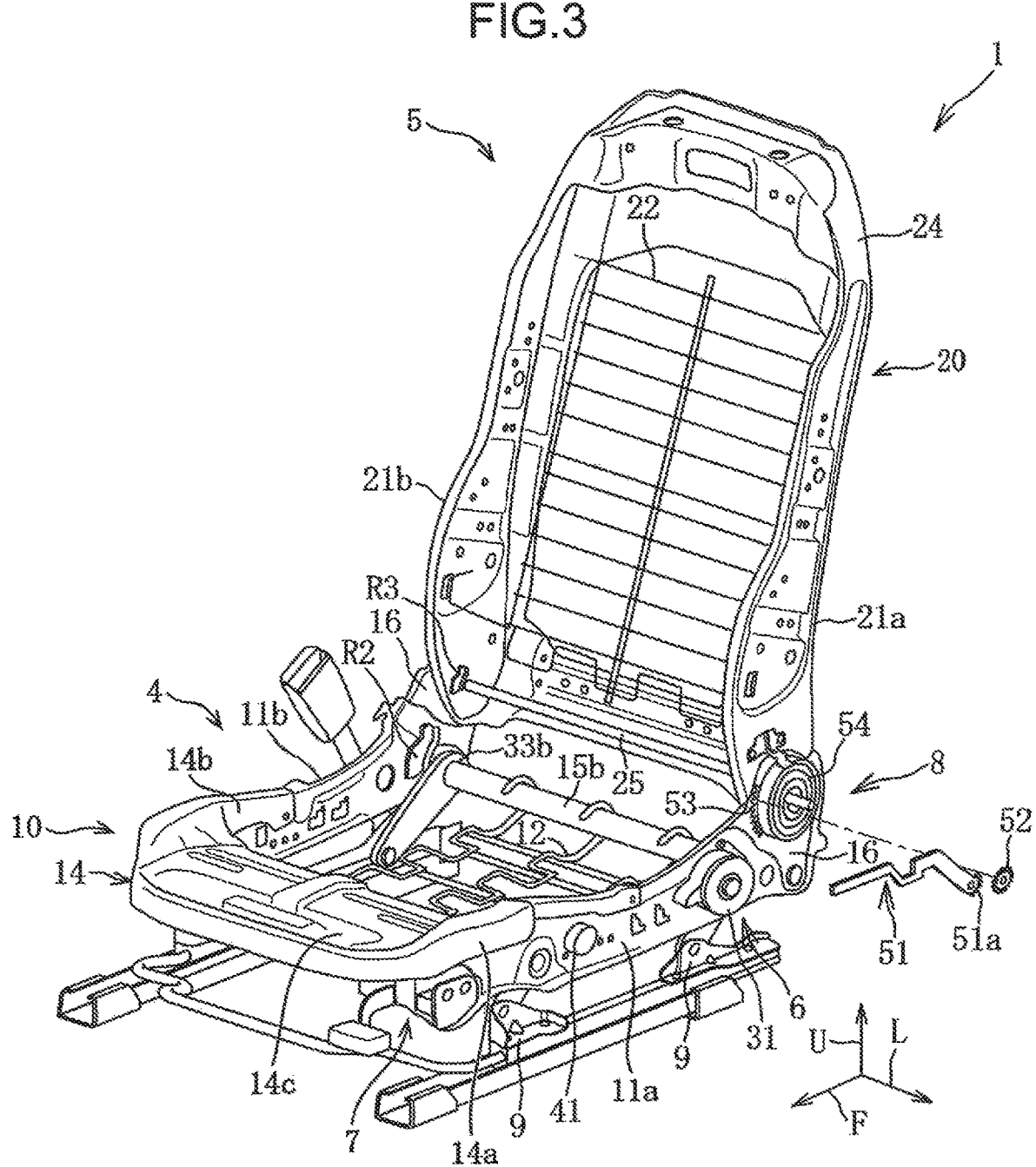
FIG. 3 is a perspective view of the seat in a state that a cushion member is omitted.

As illustrated in FIGS. 1 to 3, the leg mechanism 3 is directly fixed to the passenger apartment floor. A member for substantially imparting cushion property is not disposed between the leg mechanism 3 and the floor.

The leg mechanism 3 includes a sliding mechanism for slidably supporting the seat cushion 4 and the seat back 5 in a front-rear direction with respect to the floor. The sliding mechanism includes a pair of sliders 9 slidable along a pair of left and right slide rails, and is configured in such a way that the sliders 9 are lockable at a position desired by the occupant.

As illustrated in FIGS. 2 to 6, the seat cushion 4 includes a metal frame member 10 for imparting a structural strength to the seat cushion 4, a metal elastic member 12, a polyurethane cushion member 13, and an outer cover member (not illustrated) for covering the elements 11 to 13. In FIGS. 2 and 3, illustration of the head rest 3 is omitted.

The frame member 10 includes a pair of left and right side frames 11a and 11b extending in the front-rear direction, and a tilt pan 14 for connecting front ends of the side frames 11a and 11b to each other in a left-right direction (vehicle width direction). The side frame 11a is disposed to extend in the front-rear direction along a left portion of the seat cushion 4. The side frame 11b is disposed to extend in the front-rear direction along a right portion of the seat cushion 4. The left side frame 11a out of the paired side frames 11a and 11b corresponds to a "first side frame" in the present invention, and the right side frame 11b corresponds to a "second side frame" in the present invention.

The paired side frames 11a and 11b are each a frame extending in the front-rear direction, and formed by performing press processing to a plate member. The specifications such as a material, a plate thickness, and a size are the same between the side frames 11a and 11b. However, the side frames 11a and 11b are different in a point whether reinforcement members R1 and R2 to be described later are present.

Figure 5:
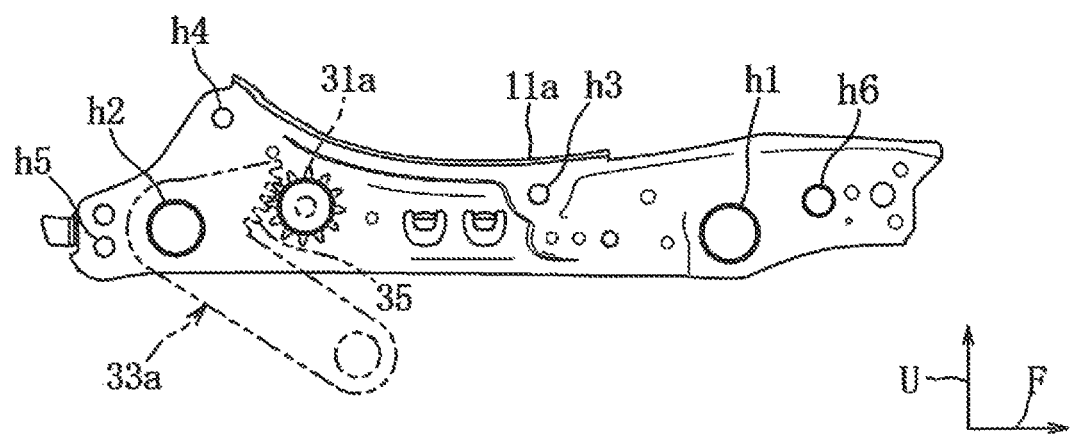
FIG. 5 is a side view illustrating an inner surface (right surface) of a left side frame.
Figure 6:
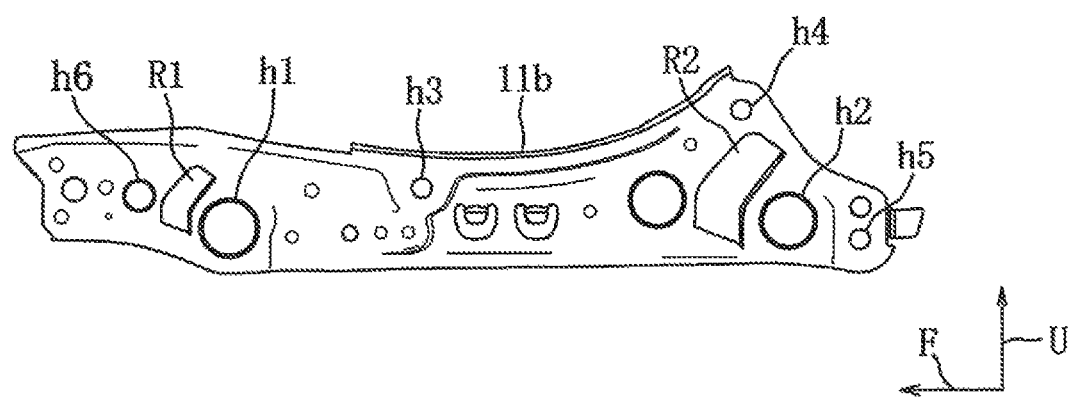
FIG. 6 is a side view illustrating an inner surface (left surface) of a right side frame.

As illustrated in FIGS. 5 and 6, each of the paired side frames 11a and 11b has a plurality of openings h1 to h6 passing through each side frame in the left-right direction (thickness direction).

The opening h1 is formed in a front portion of each of the side frames 11a and 11b. The openings h1 are holes for fixing (fittingly receiving) both ends of a connecting member 15a extending in the left-right direction (vehicle width direction). In other words, the connecting member 15a connects front portions of the side frames 11a and 11b to each other in the left-right direction by being fixed to the side frames 11a and 11b at positions of the openings h1.

The opening h2 is formed in a rear portion of each of the side frames 11a and 11b. The openings h2 are holes for fixing (fittingly receiving) both ends of a connecting member 15b extending in the left-right direction (vehicle width direction). In other words, the connecting member 15b connects rear portions of the side frames 11a and 11b to each other in the left-right direction by being fixed to the side frames 11a and 11b at positions of the openings h2.

The opening h3 is formed near the middle of an upper portion of each of the side frames 11a and 11b in the front-rear direction. The openings h3 are holes for swingably supporting rear ends of left and right side portions (a pair of extension portions 14a and 14b to be described later) of the tilt pan 14 in an up-down direction.

The opening h4 is formed in an upper rear portion of each of the side frames 11a and 11b, which is located on the upper front side of the opening h2. The opening h5 is formed in a rear end of each of the side frames 11a and 11b, which is located on the rear side of the opening h2. The openings h4 and h5 are holes for fixing brackets 16 that swingably support the seat back 5 in the front-rear direction.

The opening h6 is formed near a front end of each of the side frames 11a and 11b, which is located on the front side of the opening h1. The openings h6 are holes for receiving both ends of a connecting member 44 extending in the left-right direction (vehicle width direction). In other word, the connecting member 44 is rotatably supported about front ends of the side frames 11a and 11b via the openings h6.

As illustrated in FIG. 6, reinforcement members R1 and R2 are provided on the right side frame 11b. The reinforcement members R1 and R2 partially reinforce the side frame 11b so as to suppress the right side frame 11b from displacing inward (to the left side), when the vehicle makes a turn.

The reinforcement member R1 is disposed in a front area of the opening h1, specifically, an area from a front side to an upper side of the opening h1. The reinforcement member R1 is a metal plate member having a partially arc shape along the opening h1, and is fixedly mounted to an inner surface (left surface) of the right side frame 11b.

The reinforcement member R2 is disposed in a front area of the opening h2, specifically, an area from a front side to an upper side of the opening h2. The reinforcement member R2 is a metal plate member having a partially arc shape along the opening h2, and is fixedly mounted to an inner surface (left surface) of the right side frame 11b.

More specifically, the reinforcement member R2 is disposed in an area from a position behind a line connecting a center of the opening h4 and a center of the opening h2 to a position proximal to a lower end of the opening h2. Since the opening h4 is a hole for fixing the support bracket 16 of the seat back 5, stress based on a load input from the seat back 5 to the side frames 11a and 11b is made maximum on a peripheral portion of the opening h4, when a load such as inertia force acting on an occupant is input to the seat back 5 during acceleration of the vehicle. In view of the above, it is preferable to dispose the reinforcement member R2 to be present within predetermined radius (e.g. 75 mm) with respect to the opening h4 as a center, and align with a direction along which the side frame 11b is bent.

The tilt pan 14 includes a body portion 14c for supporting a front end of the seat cushion 4, and a pair of extension portions 14a and 14b extending rearward from left and right ends of the body portion 14c. Rear ends of the extension portions 14a and 14b are pivotally supported on the side frames 11a and 11b at the openings h3. Specifically, the tilt pan 14 is swingably supported in the up-down direction about the openings h2 as pivot points.

The elastic member 12 has a plurality of springs S made of metal wires. The elastic member 12 is mounted to be elastically deformable in the up-down direction at a position between the side frames 11a and 11b (inside the seat cushion 4) by fixation of front and rear ends of the elastic member 12 to the connecting members 15a and 15b. When the occupant is seated, the elastic member 12 supports the buttock of the occupant from below, while elastically deforming downward.

The cushion member 13 is supported by the frame member 10 and the elastic member 12, and is disposed to cover the frame member 10 and the elastic member 12. The cushion member 13 has elastic deformation characteristics (sprint characteristics) and vibration damping characteristics. When the occupant is seated, the cushion member 13 supports the buttock of the occupant in cooperation with the elastic member 12, while causing compression deformation in the up-down direction. The cushion member 13 which has undergone compression deformation recovers to the original shape, as the occupant leaves the seat.

As illustrated in FIGS. 2 and 3, the seat back 5 includes a metal frame member 20 (back frame) for imparting a structural strength to the seat back 5, a metal elastic member 22, a polyurethane cushion member 23, and an outer cover member (not illustrated) for covering the elements 21 to 23.

The frame member 20 includes a pair of left and right vertical frames 21a and 21b extending in the up-down direction, and an inverted U-shaped upper frame 24 for connecting upper ends of the vertical frames 21a and 21b in the left-right direction (vehicle width direction).

The paired vertical frames 21a and 21b are each a frame extending in the up-down direction, and formed by performing press processing to a plate member. The specifications such as a material, a plate thickness, and a size are the same between the vertical frames 21a and 21b. However, the vertical frames 21a and 21b are different in a point whether a reinforcement member R3 to be described later is present.

A connecting member 25 extending in the left-right direction is provided on a lower end of the frame member 20. Both ends of the connecting member 25 pass through lower ends of the vertical frames 21a and 21b in a thickness direction (left-right direction), and are locked by the paired brackets 16 located on the outer side of the vertical frames 21a and 21b. The connecting member 25 having the above configuration functions as pivot points of the vertical frames 21a and 21b with respect to the paired brackets 16. Specifically, the vertical frames 21a and 21b are swingably supported to the paired brackets 16 via the connecting member 25.

A gear part (a gear member 53 to be described later) of the reclining mechanism 8 is provided at a lower end of the left vertical frame 21a, and near a connecting portion between the lower end and the connecting member 25. On the other hand, a reinforcement member R3 is provided at a lower end of the right vertical frame 21b, and near a connecting portion between the lower end and the connecting member 25. The reinforcement member R3 is a metal plate member, and is fixedly mounted to an inner surface (left surface) of the right vertical frame 21b.

The elastic member 22 is a mesh spring having a plurality of metal wires stretched in a net shape. The elastic member 22 is mounted to be elastically deformable in the front-rear direction inside the seat back 5 by fixation of a periphery of the elastic member 22 to the vertical frames 21a and 21b. When the occupant is seated, the elastic member 22 supports the back of the occupant from behind, while causing elastic, deformation in the front-rear direction.

The cushion member 23 is supported by the frame member 20 and the elastic member 22, and is disposed to cover the frame member 20 and the elastic member 22. The cushion member 23 has elastic deformation characteristics (spring characteristics) and vibration damping characteristics. When the occupant is seated, the cushion member 23 supports the back of the occupant in cooperation with the elastic member 22, while causing compression deformation in the front-rear direction. The cushion member 23 which has undergone compression deformation recovers to the original shape, as the occupant leaves the seat.

The seat 1 according to the present embodiment is configured in such a way that rigidity of a frame structure is sufficiently high, as compared with rigidity of a non-frame structure. The frame structure is a strength member constituting a framework of the seat 1, and includes the frame member 10 of the seat cushion 4, and the frame member 20 of the seat back 5. The non-frame structure is a portion formed by eliminating, from the seat 1, the strength member such as the frame members 10 and 20, and for example, includes the cushion member 13 and the elastic member 12 of the seat cushion 4, and the cushion member 23 and the elastic member 22 of the seat back 5.

Rigidity of each of the frame structure and the non-frame structure can be expressed by a spring constant (N/mm). The spring constant is acquired by dividing a load acting on a structure by a displacement amount of the structure. When characteristics of the seat 1 are expressed by using the above formula in the present embodiment, a spring constant of the frame structure is set sufficiently high, as compared with a spring constant of the non-frame structure.

Specifically, in the present embodiment, a spring constant of the frame structure is set to be twenty times or more of a spring constant of the non-frame structure. Specifically, when it is assumed that a displacement amount of the frame structure is DF, and a displacement amount of the non-frame structure is DS in a case where a same load is applied to the frame structure and the non-frame structure, a relationship expressed by the following formula (1) is established.

$$20 \leq DS/DF \tag{1}$$

In this way, by setting spring constant (N/mm) of the frame structure to be twenty times or more of a spring constant of the non-frame structure, a discrepancy between displacement characteristics of the seat 1, and displacement characteristics of the vehicle body is reduced. Thus, it is possible to make an occupant seated on the seat 1 feel a sense of unity with the vehicle, and improve traveling comfort. In particular, it is desirable to set a spring constant of the frame structure to 70 N/mm or more in order to further improve traveling comfort.

A verification experiment by computer aided engineering (CAE) was performed in order to clarify an influence of a ratio between a spring constant of the frame structure and a spring constant of the non-frame structure on displacement characteristics of the seat 1.

In the experiment, prepared were a seat model A in which a value (hereinafter, referred to as a rigidity ratio) acquired by dividing a spring constant (rigidity) of the frame structure by a spring constant (rigidity) of the non-frame structure was set to about 22, and a seat model B in which the rigidity ratio was set to about 19. Further, a displacement of each part of the vehicle during steady traveling in which an acceleration of 1G was generated, a displacement of each part of the seat model A at a time of occurrence of disturbance when the vehicle climbed over a slope, and a displacement of each part of the seat model B at a time of occurrence of disturbance when the vehicle climbed over a slope were acquired by analysis.

In the analysis, the spring constant of the non-frame structure of the seat model A, and the spring constant of the non-frame structure of the seat model B were set to a same value (a spring constant of polyurethane), based on a premise that a material of the cushion member is polyurethane.

FIG. 11 is a graph, illustrating a the analysis. In FIG. 11, a horizontal axis indicates a coordinate in file front-rear direction, and a vertical axis indicates a coordinate in the up-down direction. The solid line graph indicates a position of each part of the vehicle during steady traveling in which an acceleration of IG generated. In particular, the solid line graphs annotated with "seat back (during steady traveling)", and "seat cushion (during steady traveling)" indicate positions of a seat back and a seat cushion, when the vehicle is steadily traveling. Further, the dotted line graph annotated with "seat model A" indicates a position of the seat model A, when disturbance occurs (when the vehicle climbs over a slope) in a state that an occupant is seated on the seat. The broken line graph annotated with "seat model B" indicates a position of the seat model B, when disturbance occurs in a state that the occupant is seated.

As illustrated in FIG. 11, it is clear that displacement characteristics of the seat model A at a time of occurrence of disturbance are similar to displacement characteristics (solid line) during steady traveling, as compared with displacement characteristics of the seat model B at a time of occurrence of disturbance. Thus, it can be interpreted that setting a rigidity ratio between the frame structure and the non-frame structure to 20 or more enables to provide an advantageous effect of making a behavior (displacement characteristics) of the seat close to a behavior of the vehicle body.

Next, posture changing mechanisms (the lifter mechanism 6, the tilt mechanism 7, and the reclining mechanism 8) of the seat 1 are described.

Figure 4:
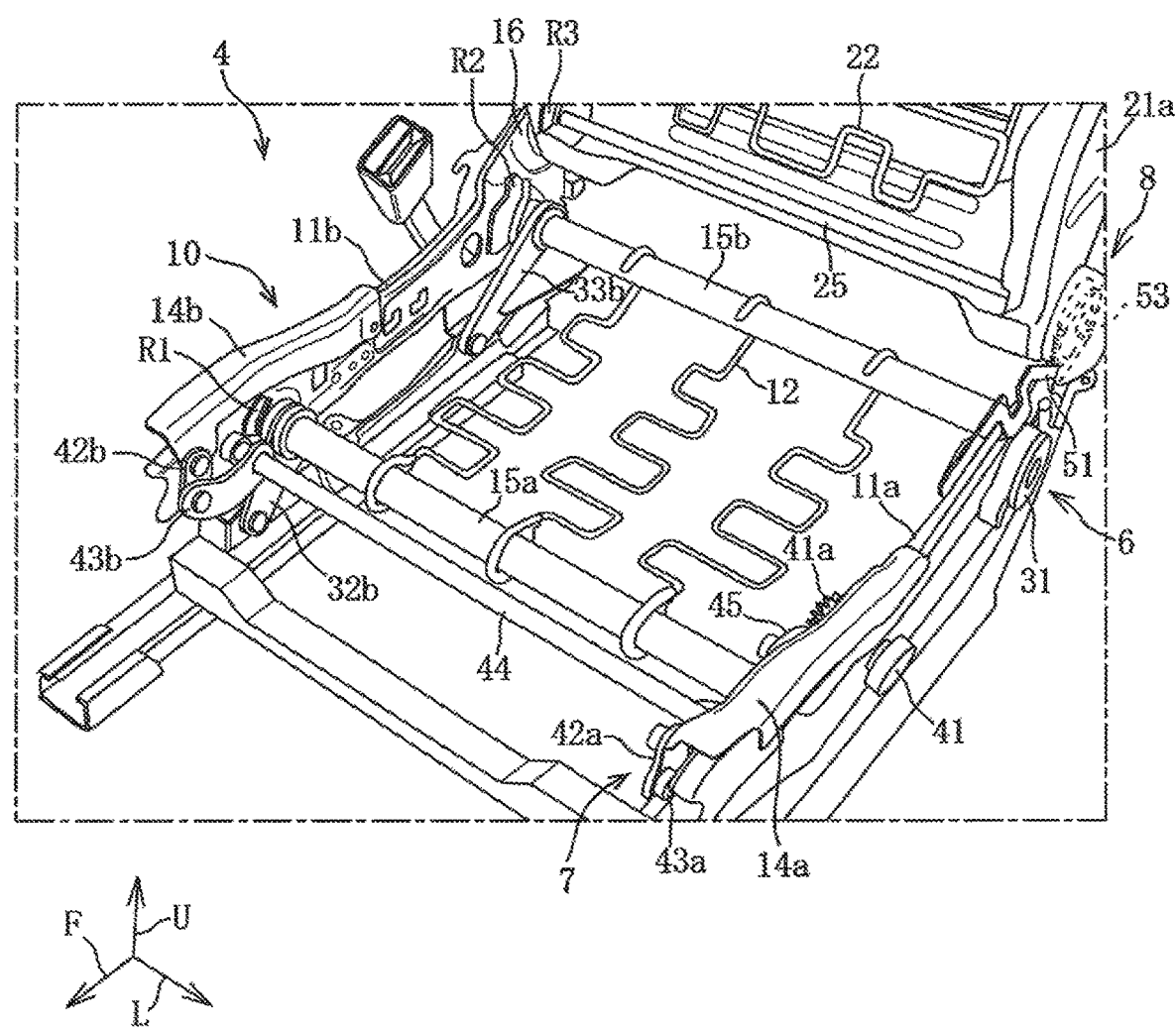
FIG. 4 is a perspective view of a seat cushion in a state that the cushion member is omitted.

As illustrated in FIGS. 2 to 4, the lifter mechanism 6 is a mechanism for raising or lowering the side frame 11a and 11b with respect to the floor (the sliders 9 of the sliding mechanism), while keeping the side frames 11a and 11b in a substantially horizontal state.

The lifter mechanism 6 is manually operated in the present embodiment. Specifically, the lifter mechanism 6 includes a lever-type operation portion 31 to be manually operated by an occupant, a pinion 31a (see FIG. 5) cooperatively connected to the operation portion 31, and a four-link mechanism operable by an operation of the operation portion 31.

The operation portion 31 is pivotally supported on an outer surface (left surface) of the left side frame 11a. The pinion 31a is disposed on an inner surface (right surface) of the left side frame 11a, and is connected to the operation portion 31 via the side frame 11a. The pinion 31a is rotatable in response to an occupant's operation of the operation portion 31.

The four mechanism includes the paired front and rear connecting members 15a and 15b, a pair of left and right front links 32a and 32b, and a pair of left and right rear links 33a and 33b.

The paired front links 32a and 32b are each a link extending obliquely in the up-down direction, and is formed to be a substantially elliptical shape in a side view. A lower end of each of the front links 32a and 32b is pivotally supported on the slider 9. Each of left and right ends of the connecting member 15a passes through an upper end of each of the front links 32a and 32b.

The right rear link 33b is a link extending obliquely in the up-down direction, and is formed to be a substantially elliptical shape in a side view. A lower end of the rear link 33b is pivotally supported on the slider 9. A right end of the connecting member 15b passes through an upper end of the rear link 33b.

The left rear link 33a is a link having a substantially L-shape in a side view (see FIG. 5), and has a large size, as compared with the right rear link 33b. A lower end of the rear link 33a is pivotally supported on the slider 9. A left end of the connecting member 15b passes through an upper portion of the rear link 33a.

As illustrated in FIG. 5, a gear portion 35 engageable with the pinion 31a is formed on an upper front portion of the left rear link 33a.

When the operation portion 31 is operated in such a direction as to pivotally move the front links 32a and 32b, and the rear links 33a and 33b clockwise in a left side view, the side frames 11a and 11b are lowered. Conversely, when the operation portion 31 is operated in such a direction as to pivotally move the front links 32a and 32b, and the rear links 33a and 33b counterclockwise in a left side view, the side frames 11a and 11b are raised.

In the present embodiment, the rear link 33a disposed on an inner surface (right surface) of the left side frame 11a is larger than the rear link 33b disposed on an inner surface of the right side frame 11b; and the pinion 31a pivotally supported on the left side frame 11a, and the gear portion 35 of the rear link 33a are engaged with each other. Therefore, as far as the left and right side frames 11a and 11b have completely same specifications, apparent rigidity of the left side frame 11a is made larger than apparent rigidity of the right side frame 11b. In other words, in the present embodiment, rigidity of a left half portion of the seat cushion 4 including equipment such as the lifter mechanism 6 is likely to increase, as compared with rigidity of a right half portion of the seat cushion 4.

Therefore, in a case where an occupant's load acting on the seat back 5 is input to peripheral portions of the openings h4 and h5 in the right side frame 11b when the vehicle turns, particularly, when the vehicle makes a left turn, the side frame 11b may be deformed so as to be inclined inward (leftward) due to a bending load acting on the side frame 11b.

However, in the present embodiment, the reinforcement member R2 is provided near a front side of the opening h2 of the right side frame 11b. The area where the reinforcement member R2 is installed on the right side frame 11b overlaps, in a side view, the lifter mechanism 6 (e.g. the pinion 31a and the gear portion 35 of the lifter mechanism 6), which is mounted on the left side frame 11a. This means that rigidity (rigidity against a bending load) of a portion of the right side frame 11b corresponding to the lifter mechanism 6 is enhanced by the reinforcement member R2. Thus, apparent rigidity of the left side frame 11a is made substantially equal to apparent rigidity of the right side frame 11b, and a phenomenon that the right side frame 11b is inclined as described above is suppressed.

Next, the tilt mechanism 7 is described.

The tilt mechanism 7 is a mechanism for raising or lowering the tilt pan 14 with respect to the side frames 11a and 11b.

The tilt mechanism 7 is manually operated in the present embodiment. Specifically, the tilt mechanism 7 includes a lever-type operation portion 41 to be manually operated by an occupant, a pinion 41a (see FIG. 4) cooperatively connected to the operation portion 41, and a link mechanism operable by an operation of the operation portion 41.

The operation portion 41 is pivotally supported on an outer surface (left surface) of the left side frame 11a. The pinion 41a is disposed on an inner surface (right surface) of the left side fame 11a, and is connected to the operation portion 41 via the side frame 11a. The pinion 41a is rotatable in response to an occupant's operation of the operation portion 41.

As illustrated in FIG. 4, the link mechanism includes the connecting member 44, a pair of left and right front links 42a and 42b, a pair of left and right rear links 43a and 43b, and a gear member 45.

Upper ends of the front links 42a and 42b are respectively and pivotally supported on the extension portions 14a and 14b of the tilt pan 14. Lower ends of the front links 42a and 42b are respectively and pivotally supported on front ends of the rear inks 43a and 43b.

Rear ends of the rear links 43a and 43b are respectively filed to both ends of the connecting member 44.

Figure 10:
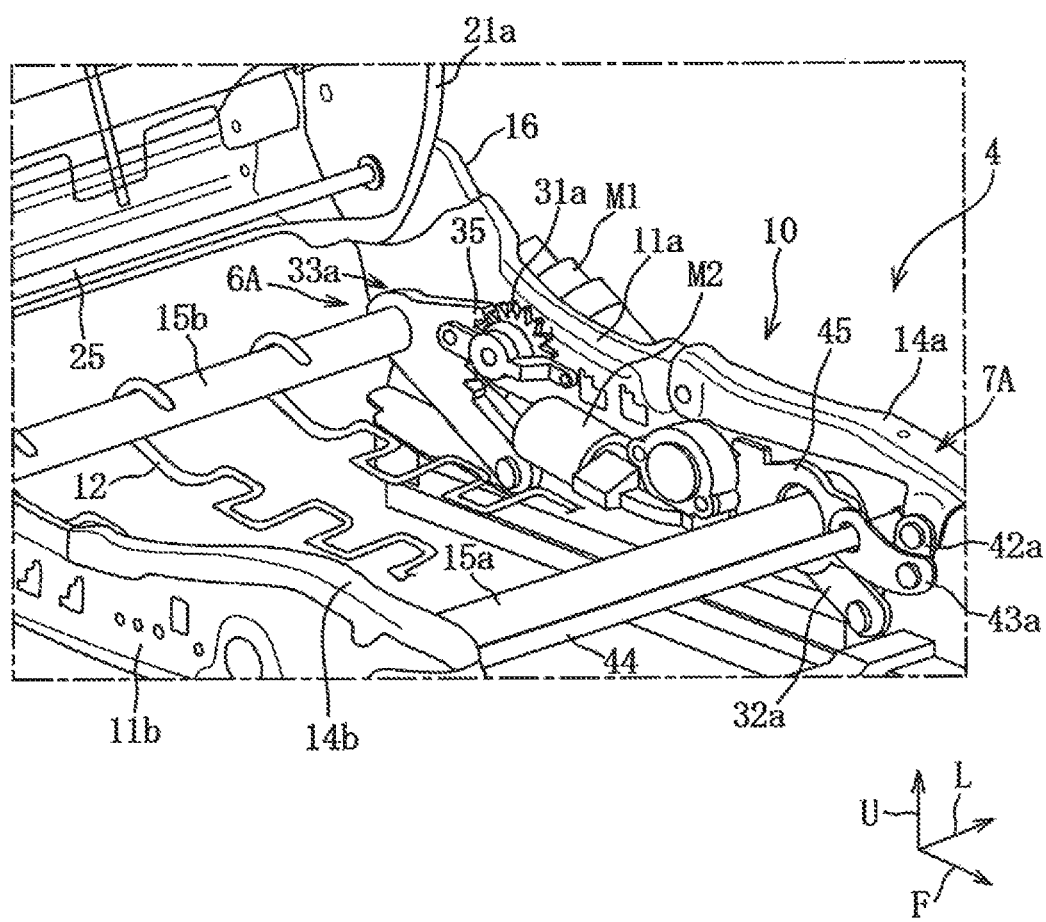
FIG. 10 is a perspective view of a seat cushion in a state that cushion member is omitted, when viewed from an angle different from FIG. 9.

The gear member 45 is pivotally supported on the left side frame 11a about the opening h1 (connecting member 15a) in the side frame 11a as a pivot point (see FIG. 10).

A rear portion of the gear member 45 is engaged with the pinion 41a, and a front portion of the gear member 45 is engaged with a gear portion (not illustrated), which is formed on the rear link 43a.

When the operation portion 41 is operated in such a direction as to pivotally move the rear links 43a and 43b clockwise in a left side view, the tilt pan 14 is pivotally moved upward about the opening hole h3 as a pivot point. Conversely, when the operation portion 41 is operated in such a direction as to pivotally move the rear links 43a and 43b counterclockwise in a left side view, the tilt pan 14 is pivotally moved downward about the opening hole h3 as a pivot point.

In the present embodiment, the gear member 45 is disposed on an inner surface (right surface) of the left side frame 11a, and the gear member 45 is engaged with the pinion 41a and the rear link 43a. Therefore, as far as the left and right side frames 11a and 11b have completely same specifications, apparent rigidity of the left side frame 11a is made larger than apparent rigidity of the right side frame 11b. In other words, in the present embodiment, rigidity of a left half portion of the seat cushion 4 including equipment such as the tilt mechanism 7 is likely to increase, as compared with rigidity of a right half portion of the seat cushion 4.

However, in the present embodiment, the reinforcement member R1 is provided near a front side of the opening h1 of the right side frame 11b. The area where the reinforcement member R1 is installed on the right side frame 11b overlaps, in a side view, the tilt mechanism 7 (e.g. the gear member 45 of the tilt mechanism 7), which is mounted on the left side frame 11a. This means that rigidity of a portion of the right side frame 11b corresponding to the tilt mechanism 7 is enhanced by the reinforcement member R1. Thus, apparent rigidity of the left side frame 11a and apparent rigidity of the right side frame 11b are made substantially equal to each other.

Next, the reclining mechanism 8 is described.

The reclining mechanism 8 is a mechanism for adjusting a tilt angle of the seat back 5 (vertical frames 21a and 21b) with respect to the side frames 11a and 11b.

The reclining mechanism 8 is manually operated in the present embodiment. Specifically, as illustrated in FIG. 3, the reclining mechanism 8 includes a lever-type operation portion 51 to be manually operated by an occupant, a gear member 52 operable by an operation of the operation portion 51, a gear member 53 engageable with the gear member 52, and an urging member 54 for urging the seat back 5 in such a direction as to pivotally move the seat back 5 forward about the connecting member 25.

One end of each of the operation portion 51, the gear member 52, and the urging, member 54 is supported on the left bracket 16. The gear member 53 is fixed to a lower end of the left vertical frame 21a. The other end of the urging member 54 is locked by a lower end of the left vertical frame 21a.

As described above, in the present embodiment, the gear member 53 is provided on a lower end of the left vertical frame 21a, and the gear member 53 is engaged with the gear member 52 supported on the left bracket 16. Therefore, as far as the left and right vertical frames 21a and 21b have completely same specifications, apparent rigidity of the left vertical frame 21a is made larger than apparent rigidity of the right vertical frame 21b. In other words, in the present embodiment, rigidity of a left half portion of the seat back 5 including equipment such as the reclining mechanism 8 is likely to increase, as compared with rigidity of a right half portion of the seat back 5.

However, in the present embodiment the reinforcement member R3 is provided on a lower end of the right vertical frame 21b, and at a position near a connecting portion between the lower end and the connecting member 25. The area where the reinforcement member R3 is installed on the right vertical frame 21b overlaps, in a side view, the reclining mechanism 8 (e.g. the gear member 52 of the reclining mechanism 8), which is mounted on the left vertical frame 21a. This means that rigidity of a portion of the right vertical frame 21b corresponding to the reclining mechanism 8 is enhanced by the reinforcement member R3. Thus, apparent rigidity of the left vertical frame 21a and apparent rigidity of the right vertical frame 21b are made substantially equal to each other.

Next, operations and advantageous effects of the vehicle seat 1 are described.

In order to verify the operations and the advantageous effects, an experiment by computer aided engineering (CAE) was performed. In the verification experiment, prepared were an experimental model having the same specifications as the first embodiment (FIGS. 1 to 6), and a comparative model in which the reinforcement members R1 and R2 were eliminated from the right side frame 11b in the first embodiment. Further, a load of 100 N along the vehicle width direction was input to a position equivalent to the opening h4 in the right side frame 11b of each of the models, and a displacement amount at a position near an upper side of the opening h5 was calculated.

Figure 7:
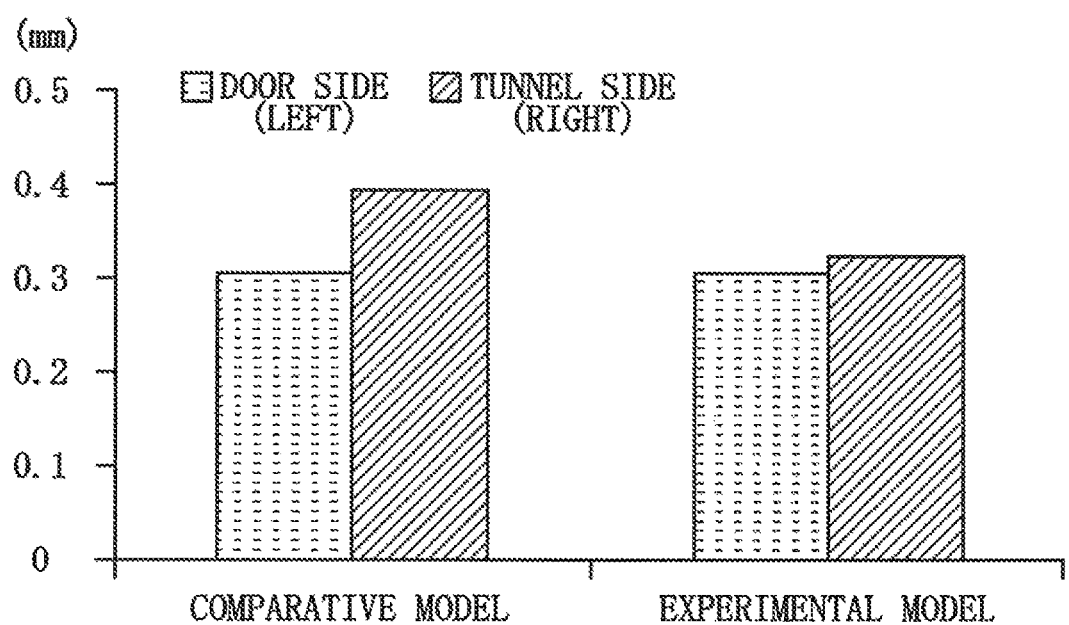
FIG. 7 is a graph illustrating a result of analysis, which has been carried out to verify an advantageous effect of the present invention.

FIG. 7 illustrates a result of the analysis. As illustrated in FIG. 7, in the comparative model, a displacement amount of the right side frame 11b is large, as compared with a displacement amount of the left side frame 11a, and an inclination phenomenon occurs in the right side frame 11b. This is conceivably because rigidity of the left side frame 11a is enhanced by the presence of a posture changing mechanism including the lifter mechanism 6 and the tilt mechanism 7. On the other hand, in the experimental model, despite that a posture changing mechanism is provided in the left side frame 11a as in the comparative model, a displacement amount of the left side frame 11a is substantially equal to a displacement amount of the right side frame 11b. This is conceivably because of the operations of the reinforcement members R1 and R2 provided on the right side frame 11b.

As described above, in the seat 1 according to the first embodiment, since the lifter mechanism 6 and the tilt mechanism 7 (posture changing mechanisms) capable of changing a posture of the seat cushion 4 are provided only on the left side frame 11a, it is possible to secure comfort of an occupant by appropriately adjusting a seated posture of the occupant, while reducing the weight of the seat 1 including the lifter mechanism 6 and the tilt mechanism 7.

Further, since the reinforcement members R1 and R2 are provided at portions of the right side frame 11b where the reinforcement members R1 and R2 overlap the lifter mechanism 6 and the tilt mechanism 7 in a side view, it is possible to reduce a rigidity difference between left and right portions of the seat cushion 4 including equipment such as the lifter mechanism 6 and the tilt mechanism 7, in other words, a difference between rigidity of a left half portion of the seat cushion here both of the mechanisms 6 and 7 are provided, and rigidity of a right half portion of the seat cushion 4 where the mechanisms 6 and 7 are not provided. Thus, it is possible to suppress displacement of the seat 1 resulting from the rigidity difference.

Specifically, in the first embodiment, since a gear part (e.g. the pinion 31a and the gear portion 35) of the lifter mechanism 6, and a gear part (e.g. the gear member 45) of the tilt mechanism 7 are mounted on the left side frame 11a, a rigidity difference is likely to occur between a left half portion and a right half portion of the seat cushion 4 due to the presence of these gear parts. However, in the first embodiment, the reinforcement members R1 and R2 are provided on the right side frame 11b on which the lifter mechanism 6 and the tilt mechanism 7 are not mounted. This enables to advantageously reduce the rigidity difference, while securing a posture adjustment function by the lifter mechanism 6 and the tilt mechanism 7.

Further, by the effect of reducing a rigidity difference by the reinforcement members R1 and R2, it is possible to suppress the right side frame 11b from displacing so as to be inclined inward (leftward) by receiving a load from an occupant, which is input via the seat 1, when the vehicle makes a turn, particularly, when the vehicle makes a turn (specifically, makes a left turn) in a state that the driver turns the steering wheel leftward, which is a side where the lifter mechanism 6 and the tilt mechanism 7 are installed. Thus, it is possible to make displacement amounts of a left half portion and a right half portion of the seat cushion 4 substantially equal to each other in the vehicle width direction.

Second Embodiment

Figure 8:
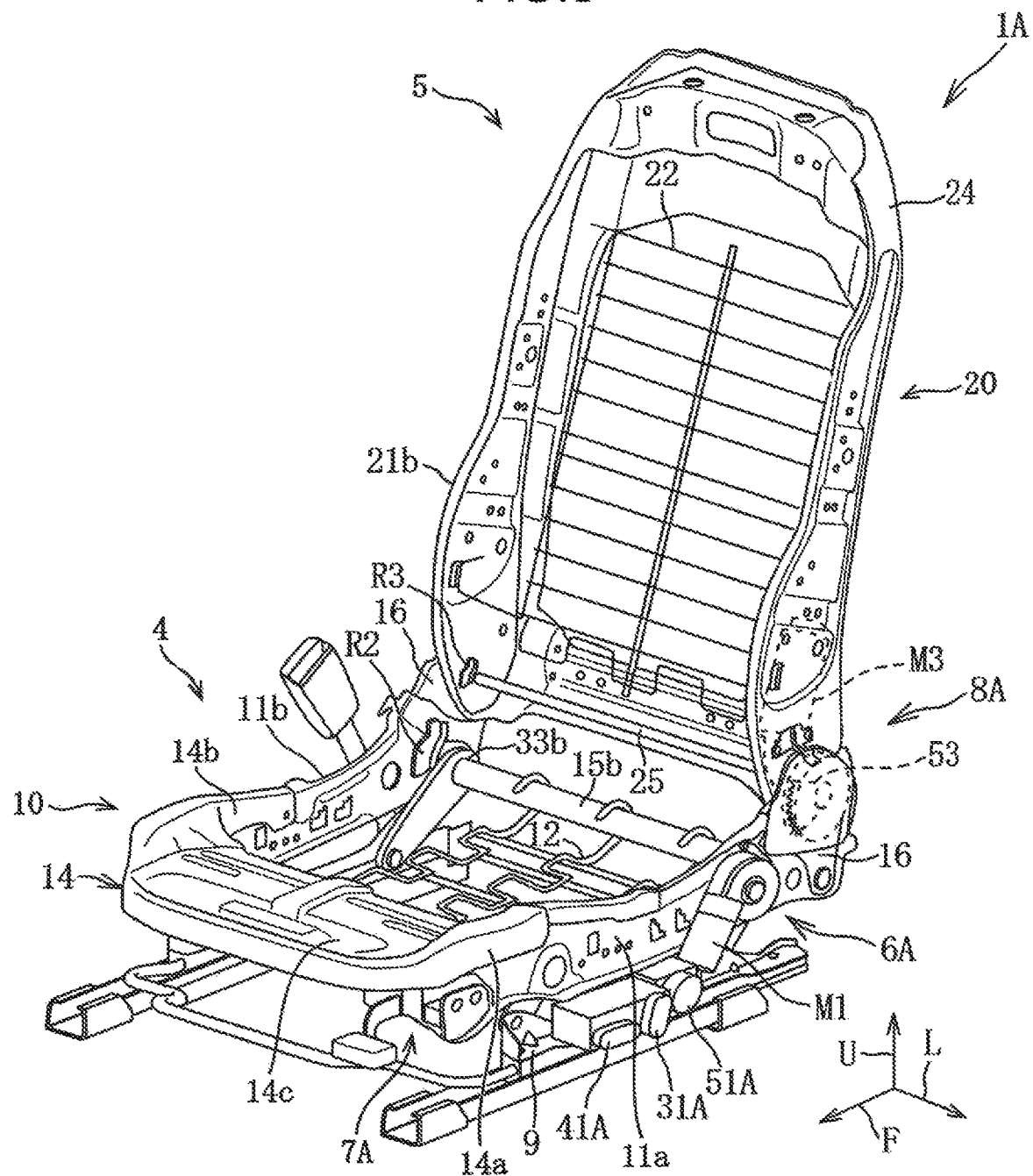
FIG. 8 is a diagram equivalent to FIG. 3, and illustrates a second embodiment of the present invention.
Figure 9:
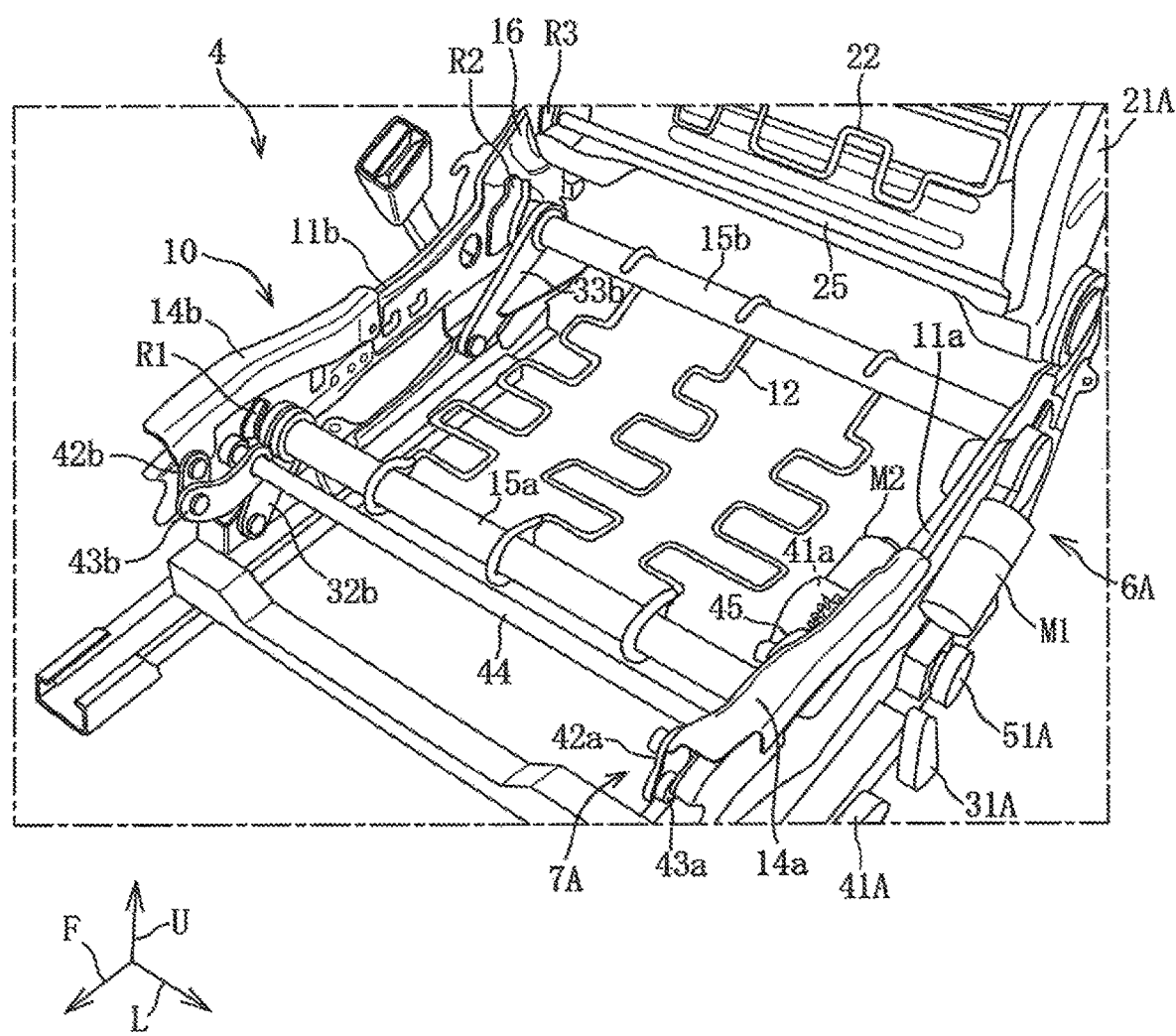
FIG. 9 is a diagram equivalent to FIG. 4, and illustrates the second embodiment of the present invention.

Next, a vehicle seat 1A according to a second embodiment of the present invention is described with reference to FIGS. 8 to 10. In FIGS. 8 to 10, members similar to those in the first embodiment are indicated with the same reference numbers, and detailed description thereof is omitted.

Whereas, in the first embodiment, manually operated posture changing mechanisms (6 to 8) are employed, in the second embodiment, electrically operated posture changing mechanisms (6A to 8A) to be driven by electric motors M1 to M3 are employed.

As illustrated in FIGS. 8 to 10, the lifter mechanism 6A includes an operation portion 31A to be operated by an occupant, the motor M1 to be driven in response to an operation of the operation portion 31A, a pinion 31a, and a 4-link mechanism. The motor M1 is disposed on an outer surface (left surface) of the left side frame 11a, and is able to drive and rotate the pinion 31a.

The tilt mechanism 7A includes an operation portion 41A to be operated by an occupant, the motor M2 to be driven in response to an operation of the operation portion 41A, a pinion 41a, and a link mechanism. The motor M2 is disposed on an inner surface (right surface) of the left side frame 11a, and is able to drive and rotate the pinion 41a.

As illustrated in FIG. 8, the reclining mechanism 8A includes an operation portion 51A to be operated by an occupant, the motor M3 to be driven in response to an operation of the operation portion 51A, and gear members 52 and 53 engaged with each other. The motor M3 is disposed on an inner surface (right surface) of a left vertical frame 21a, and is able to drive and rotate the gear member 52.

Similarly to the first embodiment, reinforcement members R1 to R3 are provided on a side frame 11b on a side (right side) opposite to a left side frame 11a on which the posture changing mechanisms (the lifter mechanism 6A, the tilt mechanism 7A, and the reclining mechanism 8A) are provided.

As described above, in the second embodiment, although the electrically operated posture changing mechanisms (6A to 8A) having the motors M1 to M3 as drive sources are provided on one side portion of the seat 1A, the reinforcement members R1 to R3 are provided on a frame on a side opposite to the posture changing mechanisms. Therefore, it is possible to reduce, by the reinforcement members R1 to R3, a rigidity difference between left and right portions of the seat 1A due to the presence of the posture changing mechanisms including the motors M1 to M3.

Next, modifications in which the embodiments are partially modified are described.

(1) The embodiments describe an example in which a lifter mechanism, a tilt mechanism, and a reclining mechanism are provided in a seat, as posture changing mechanisms. A seat to which the present invention is applicable, however, may include at least one of a lifter mechanism and a tilt mechanism. In this case, providing a reinforcement member on a frame on which a lifter mechanism and/or a tilt mechanism are not provided enables to provide advantageous effects similar to those of the embodiments.

Further, when equipment other than the posture changing mechanisms, and capable of increasing apparent rigidity of aa side frame is provided on one side portion of a seat, an additional reinforcement member may be provided on a frame on a side opposite to the frame on which the other equipment is provided.

(2) The embodiments describe an example in which a lifter mechanism and a tilt mechanism are mounted on a left side frame. Alternatively, a lifter mechanism and a tilt mechanism may be mounted on a right side frame. In this case, a reinforcement member may be provided on a portion of the left side frame where the reinforcement member overlaps the lifter mechanism and the tilt mechanism in a side view.

(3) In addition to the above, a person skilled in the art may add various modifications to the embodiments or combine the embodiments, as far as the modifications do not depart from the gist of the present invention. The present invention also includes such modifications.

Overview of Embodiments

The following is an overview of the embodiments.

A seat structure according to the embodiments is applied to a vehicle seat provided with a seat cushion and a seat back. The seat structure includes: a first side frame extending in a front-rear direction along one side portion of the seat cushion; a second side frame extending in the front-rear direction along the other side portion of the seat cushion; a posture changing mechanism mounted on the first side frame, and capable of changing a posture of the seat cushion; and a reinforcement member provided at a portion of the second side frame where the reinforcement member overlaps the posture changing mechanism in a side view.

In the vehicle seat structure, it is possible to appropriately adjust a seated posture of an occupant by the posture changing mechanism mounted on the first side frame of the seat cushion, and, secure occupant's comfort.

Further, since the reinforcement member is provided at a portion of the second side frame where the reinforcement member overlaps the posture changing mechanism in a side view, it is possible to reduce a rigidity difference between left and right portions of the seat cushion including equipment such as the posture changing mechanism, namely, a difference between rigidity of one of a left half portion and a right half portion of the seat cushion including the posture changing mechanism, and rigidity of the other thereof. Thus, it is possible to suppress displacement of the seat resulting from the rigidity difference.

Preferably, the reinforcement member may have a function of suppressing the second side frame from displacing toward the first side frame.

In the above configuration, it is possible to suppress the second side frame from displacing so as to be inclined inward (toward the first side frame) by receiving a load input from the occupant via the seat, when the vehicle makes a turn, particularly, when the vehicle makes a turn in a state that the driver turns the steering wheel toward a side (toward the first side frame) where the posture changing mechanism is provided. Thus, it is possible to make displacement amounts of the left half portion and the right half portion of the seat cushion substantially equal to each other in a vehicle width direction.

Preferably, the posture changing mechanism may include at least one of a lifter mechanism for raising or lowering the seat cushion, while keeping the seat cushion in a substantially horizontal state, and a tilt mechanism for raising or lowering a front end of the seat cushion.

In the above configuration, it is possible to reduce, by the reinforcement member, a rigidity difference between the left and right portions of the seat cushion resulting from the presence of a gear part and the like included in the lifter mechanism and/or the tilt mechanism.

The posture changing mechanism may be an electrically operated mechanism including an electric motor as a drive source.

In the above configuration, it is possible to reduce, by the reinforcement member, a rigidity difference between the left and right portions of the seat cushion resulting from the presence of the electric motor and the like included in the posture changing mechanism.

The invention claimed is:

1. A vehicle seat structure provided with a seat cushion and a seat back, comprising:
   a first side frame extending in a front-rear direction along one side portion of the seat cushion;
   a second side frame extending in the front-rear direction along the other side portion of the seat cushion;
   a posture changing mechanism mounted on the first side frame, and capable of changing a posture of the seat cushion; and
   a reinforcement member provided at a portion of the second side frame where the reinforcement member overlaps the posture changing mechanism in a side view, wherein
   the reinforcement member is a plate member that is fixedly mounted to an inner surface of the second side frame, the plate member having a partial arc shape along a periphery of an opening formed in the second side frame,
   the posture changing mechanism includes a lifter mechanism for raising or lowering the seat cushion,
   the lifter mechanism includes:
      an operation member pivotally supported on an outer surface of the first side frame;
      a pinion disposed on an inner surface of the first side frame and connected to the operation member; and
      a link member pivotally supported on the inner surface of the first side frame and engaged with the pinion, and
   the reinforcement member is provided at a portion of the second side frame where the reinforcement member overlaps the pinion in the side view.

2. The vehicle seat structure according to claim 1, wherein the reinforcement member has a function of suppressing the second side frame from displacing toward the first side frame.

3. The vehicle seat structure according to claim 2, wherein the posture changing mechanism includes at least one of a lifter mechanism for raising or lowering the seat cushion, while keeping the seat cushion in a substantially horizontal state, and a tilt mechanism for raising or lowering a front end of the seat cushion.

4. The vehicle seat structure according to claim 3, wherein the posture changing mechanism is an electrically operated mechanism including an electric motor as a drive source.

5. The vehicle seat structure according to claim 2, wherein the posture changing mechanism is an electrically operated mechanism including an electric motor as a drive source.

6. The vehicle seat structure according to claim 1, wherein the posture changing mechanism includes at least one of a lifter mechanism for raising or lowering the seat cushion, while keeping the seat cushion in a substantially horizontal state, and a tilt mechanism for raising or lowering a front end of the seat cushion.

7. The vehicle seat structure according to claim 6, wherein the posture changing mechanism is an electrically operated mechanism including an electric motor as a drive source.

8. The vehicle seat structure according to claim 1, wherein the posture changing mechanism is an electrically operated mechanism including an electric motor as a drive source.

9. A vehicle seat structure provided with a seat cushion and a seat back, comprising:
   a first side frame extending in a front-rear direction along one side portion of the seat cushion;
   a second side frame extending in the front-rear direction along the other side portion of the seat cushion;
   a posture changing mechanism mounted on the first side frame, and capable of changing a posture of the seat cushion; and
   a reinforcement member provided at a portion of the second side frame where the reinforcement member overlaps the posture changing mechanism in a side view, wherein the reinforcement member is a plate member that is fixedly mounted to an inner surface of the second side frame, the plate member having a partial arc shape along a periphery of an opening formed in the second side frame, the posture changing mechanism includes a tilt mechanism for raising or lowering a front end of the seat cushion, the tilt mechanism includes:
- an operation member pivotally supported on an outer surface of the first side frame;
- a pinion disposed on an inner surface of the first side frame and connected to the operation member;
- a gear member pivotally supported on the inner surface of the first side frame and engaged with the pinion; and
- a link member pivotally supported on the inner surface of the first side frame and engaged with the gear member, and the reinforcement member is provided at a portion of the second side frame where the reinforcement member overlaps the gear member in the side view.

\* \* \* \* \*